United States Patent
Huth et al.

(10) Patent No.: US 11,791,683 B2
(45) Date of Patent: Oct. 17, 2023

(54) MULTI-TOOTH COIL WINDING FOR A THREE-PHASE ROTATING FIELD MACHINE

(71) Applicant: ebm-papst Mulfingen GmbH & Co. KG, Mulfingen (DE)

(72) Inventors: Gerhard Huth, Hohenroth-Leutershausen (DE); Jens Krotsch, Niederstetten (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 536 days.

(21) Appl. No.: 16/769,980

(22) PCT Filed: Dec. 3, 2018

(86) PCT No.: PCT/EP2018/083374
§ 371 (c)(1),
(2) Date: Sep. 1, 2020

(87) PCT Pub. No.: WO2019/110523
PCT Pub. Date: Jun. 13, 2019

(65) Prior Publication Data
US 2021/0104929 A1    Apr. 8, 2021

(30) Foreign Application Priority Data
Dec. 5, 2017   (DE) .................... 10 2017 128 832 .5

(51) Int. Cl.
*H02K 3/18*    (2006.01)
*H02K 3/28*    (2006.01)

(52) U.S. Cl.
CPC .............. *H02K 3/18* (2013.01); *H02K 3/28* (2013.01)

(58) Field of Classification Search
CPC ...................................... H02K 3/18; H02K 3/28
(Continued)

(56) References Cited

U.S. PATENT DOCUMENTS 9,531,227 B2 * 12/2016  Azusawa ................. H02K 3/12
2002/0163273 A1   11/2002  Huth
(Continued)

FOREIGN PATENT DOCUMENTS

DE       10114014 A1   10/2002
DE   202017103491 U1    7/2017
(Continued)

OTHER PUBLICATIONS

International Search Report (in English and German) and Written Opinion (in German) dated Feb. 14, 2019 in corresponding PCT Application No. PCT/EP2018/083374; ISA/EP.
(Continued)

*Primary Examiner* — Alexander Talpalatski
(74) *Attorney, Agent, or Firm* — Harness, Dickey & Pierce, P.L.C.

(57) ABSTRACT

A 3-strand rotating field machine with a 2p-pole stator with winding teeth (Z), formed with a winding arrangement in tooth coil technology, has three winding strands (W1, W2, W3). The winding arrangement is formed from wound coil groups (G) with coils that are multiply interleaved. The partial coils (T) of the coil groups (G) are arranged so they concentrically enclose one another from inside to outside and surround two or more winding teeth (Z). The respective coil winding numbers in the grooves (N) between the winding teeth (Z) are provided. Thus, in each case a substantially equal occupancy of each groove (N) is provided with the same effective total conductor cross section of the coils per groove cross section.

5 Claims, 3 Drawing Sheets

Figure 1:
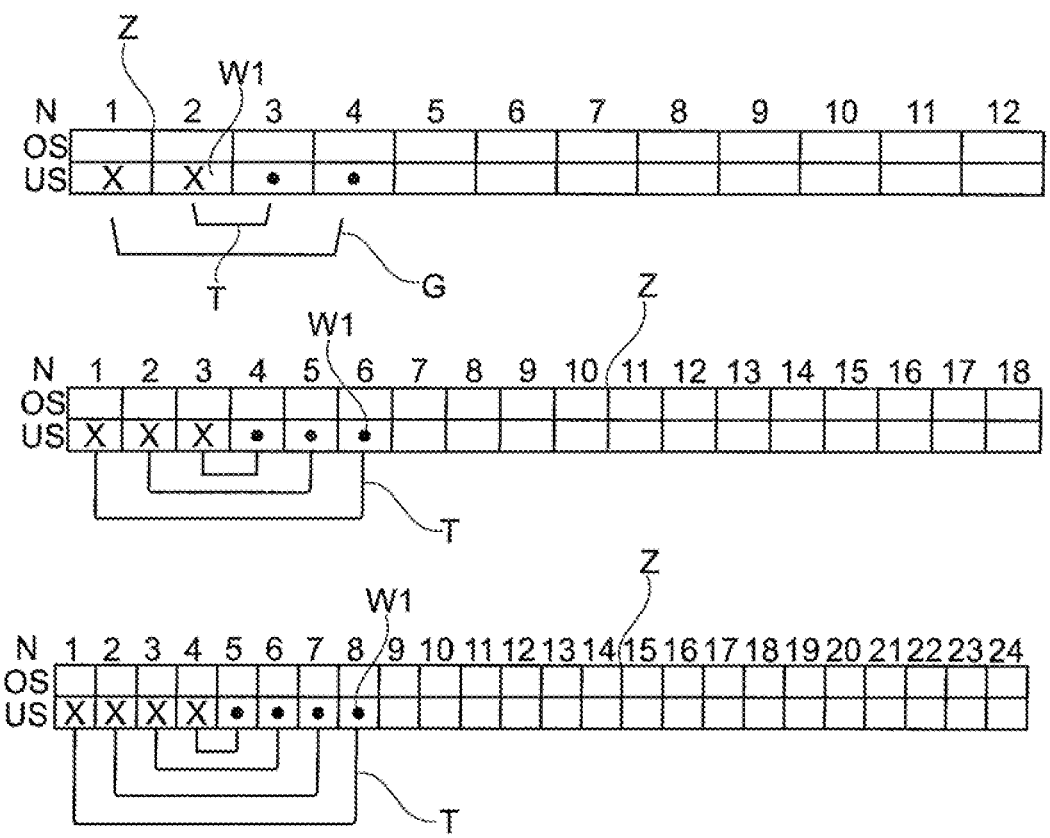

(58) Field of Classification Search
USPC .......................................................... 310/195
See application file for complete search history.

(56) References Cited

U.S. PATENT DOCUMENTS

| | | | |
|---|---|---|---|
| 2006/0017347 A1* | 1/2006 | Rahman | H02K 3/28 |
| | | | 310/180 |
| 2012/0001512 A1 | 1/2012 | Dajaku | |
| 2012/0228981 A1 | 9/2012 | Dajaku | |
| 2014/0035425 A1 | 2/2014 | Dajaku | |
| 2014/0339936 A1* | 11/2014 | Sahara | H02K 3/28 |
| | | | 310/71 |
| 2015/0091408 A1* | 4/2015 | Azusawa | H02K 3/12 |
| | | | 310/208 |
| 2019/0149004 A1* | 5/2019 | Tamura | H02K 3/04 |
| | | | 310/71 |

FOREIGN PATENT DOCUMENTS

| | | |
|---|---|---|
| WO | WO-2008044019 A2 | 4/2008 |
| WO | WO-2014033623 A2 | 3/2014 |

OTHER PUBLICATIONS

"Winding Pattern" rlib Electric Motor Design & Analysis Assist Tool; Accessed May 23, 2023. https://rlib.redarm.in/post/winding-pattern/.

"Difference between single layer Winding and Double layer windings" The Electrical Portal Electrical Engineers Blog; Mar. 29, 2020. https://www.theelectricalportal.com/2020/03/difference-between-single-layer-winding-and-double-layer-windings.html.

* cited by examiner

MULTI-TOOTH COIL WINDING FOR A THREE-PHASE ROTATING FIELD MACHINE

CROSS-REFERENCE TO RELATED APPLICATIONS

This application is a National Stage of International Application No. PCT/EP2018/083374, filed on Dec. 3, 2018 and published in German as WO2019110523A1 on Jun. 13, 2019. This application claims priority to German Application No. 10 2017 128 832.5, filed on Dec. 5, 2017. The entire disclosures of all of the above applications are incorporated herein by reference.

FIELD

The disclosure relates to a winding arrangement for a 3-strand rotating field machine and to a 3-strand rotating field machine with such a winding arrangement.

Inverter-fed permanent magnet-excited synchronous machines (PM synchronous machines) are used in numerous technical applications. For cost reasons, PM synchronous machines are increasingly implemented with so-called tooth coil windings. The tooth coil technology simplifies the stator design of PM synchronous machines. Additionally, it enables a segmented stator design. Thus, the stator can be produced in a modular manner in a building block design. In tooth coil windings it is disadvantageous if they form a wide air gap field spectrum that can be more or less interfering depending on the motor design.

In the prior art, different winding concepts for tooth coil windings are known. The printed publication US 20120228981 A1 aims to reduce a subharmonic with respect to the operating field wave. It proposes to achieve this aim with a multilayer winding consisting of at least two coil sides per groove. The number of conductors of the coil sides in a first groove is different from the number of conductors of the coil sides in a second groove. Thus the coils are implemented as tooth coils.

In the printed publication US 20120001512 A1, a stator with a double number of grooves in comparison to the prior art is proposed. The coils, here, enclose, in each case, two teeth. The coils are characterized by different number of windings with identical coil width.

The printed publication US 20140035425 A1 also relates to reducing undesired upper fields by a winding that can be produced cost effectively. A multilayer tooth coil winding is proposed where the individual coils of a strand have different numbers of windings. Also, the teeth support a different number of tooth coils. This winding topology is also not expedient for small numbers of poles.

In so-called AC line start motors, the line start functionality is necessary. The wide air gap field spectrum of the tooth coil winding has an interfering effect. Thus, due to the resulting harmonic torques, the startup of the line start motors overall is interfered with or even prevented. Cage rotor motors and PM line start motors can therefore not be reasonably implemented with the tooth coil windings of the prior art.

On the other hand, for example, small PM synchronous motors that are operated field-oriented on the inverter and are used increasingly in the sector of high rotational speed drives can in principle be implemented with the tooth coil technology.

An additional basic problem consists of the use of the tooth coil winding in the case of low numbers of poles. Since the principle of tooth coil windings leads to higher numbers of poles, the PM synchronous motors, with low number of poles (for example, 2-pole or 4-pole), for high rotational speed drives can be implemented only to a very limited extent with the known tooth coil windings.

SUMMARY

Therefore, it is an object of the present disclosure to remedy the aforementioned disadvantages. The disclosure proposes a winding topology in the form of a tooth coil winding for a 3-strand rotating field machine, such as, for example, a 3-strand n engine design, that can also be used effectively in the case of low numbers of poles (2-pole and 4-pole). Additionally, it has an advantageous winding field spectrum.

This object is achieved by a 3-strand rotating field machine with a 2p-pole stator with winding teeth (Z), formed with a winding arrangement in tooth coil technology, that comprises: three winding strands. The winding arrangement is formed from wound coil groups with coils that are multiply interleaved. The partial coils of the coil groups are arranged so they concentrically enclose one another from inside to outside and surround two or more winding teeth. The respective coil winding numbers, in the grooves between the winding teeth, are provided so that in each case a substantially equal occupancy of each groove is provided with the same effective total conductor cross section of the coils per groove cross section. Thus, a continuous or quasi-continuous decrease of the number of conductors of the number of conductors occurs from outside to inside.

An underlying idea of the present disclosure provides a tooth coil winding with a specific winding scheme for three winding strands W1, W2, W3. It includes coil groups with coils that are multiply interleaved and preferably have a continuously changing width. The partial coils of the coil groups are arranged so that they concentrically enclose one another from inside to outside, without crossing of the conductors of the partial coils. They surround one or more teeth and have identical or different numbers of coil windings with a substantially equal occupancy of each groove with the same effective total conductor cross section per groove cross section.

It is particularly preferable if the coil groups are arranged diametrically symmetrically with respect to one another. They partially overlap spatially along the circumference in their arrangement in the winding layers.

Thus, according to the disclosure, a 3-strand rotating field machine with a 2p-pole stator with winding teeth is provided. It is formed with a winding arrangement in the tooth coil technology, and comprises three winding strands W1, W2, W3. The winding arrangement is formed from wound coil groups with coils (partial coils) that are multiply interleaved. The partial coils of the coil groups are arranged so that they enclose one another concentrically from inside to outside and surround two or more winding teeth. The respective coil winding numbers, in the grooves between the winding teeth, are provided or wound. Thus, in each case, a substantially equal occupancy of each groove is provided with the same effective total conductor cross section of the coils per groove cross section.

It is particularly preferable if the coil groups in the front area do not overlap. They are designed without crossing conductors, crossing partial coils or crossing coil groups.

The mentioned object can thus be achieved by a 3-strand "multi-tooth coil winding" that also represents a distributed tooth coil winding. The basic element and thus the common part of such a 3-strand multi-tooth coil winding is a q-fold tooth coil that, in each case occupies half of 2*q adjacent grooves of the stator (in the upper layer or the lower layer). The factor q is preferably q=2, 3 or 4.

In an advantageous design of the disclosure, in each case adjacent winding teeth or grooves of the stator are wound in part with a winding strand, namely either in the upper layer or in the lower layer.

It is also advantageously provided that the number of conductors of a farther outward lying partial coil of a coil group is greater than the number of conductors of a farther inward lying partial coil. The partial coil arrangement is always concentric.

In an advantageous design of the disclosure, the number of conductors of the partial coils decreases from the outer partial coil to the inner partial coil. In a design that is particularly advantageous, the number of conductors of the partial coils continuously decreases from the outer partial coil to the inner partial coil. The decrease of the number of conductors decreases in equal increments from partial coil to partial coil.

A design that is particularly suitable in practice provides that, with q=3, exactly 3 partial coils are wound around the corresponding multi-tooth coil. The number of the conductors of the partial coils of a multi-tooth coil is distributed as follows:
a. the outermost partial coil (T): Zo conductors+$\Delta$Z conductors
b. the central partial coil (T): Zo conductors
c. the inner partial coil (T): Zo conductors−$\Delta$Z conductors.

Here, the value Zo represents a predetermined number of conductors in the partial coil. $\Delta$Z represents the difference of the number of conductors with respect to the respective outer lying or inner lying partial coil.

Additional advantageous designs of the disclosure are in the dependent claims and represented in greater detail below together with the description of the preferred embodiment of the invention in reference to the figures.

DRAWINGS

Figure 2:
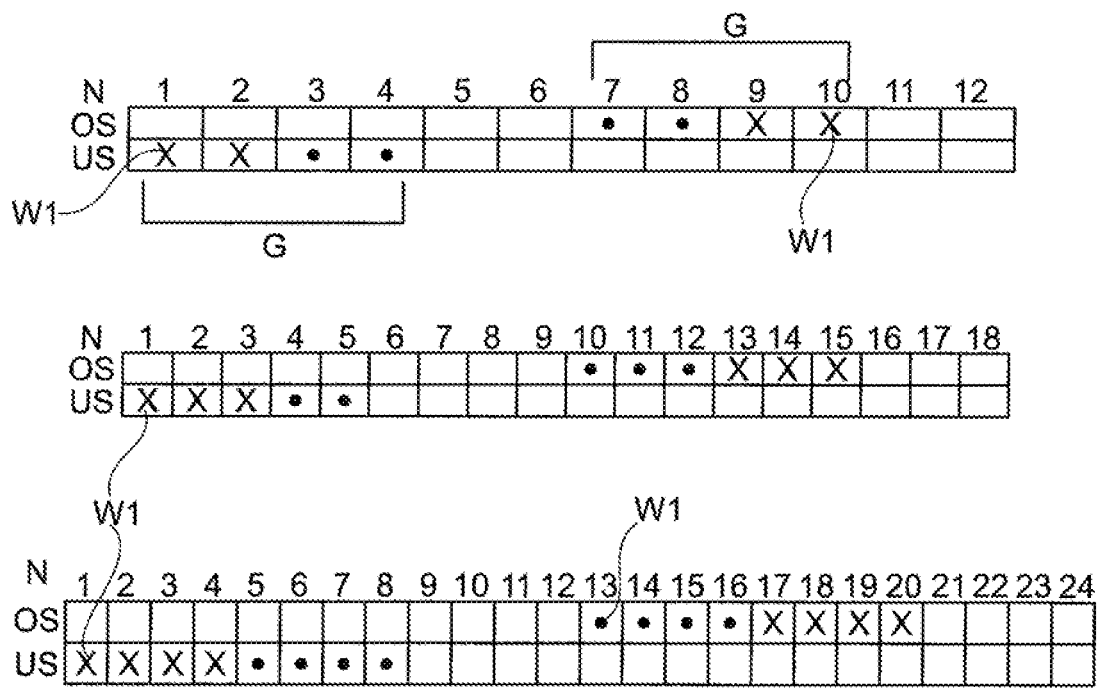
Figure 3:
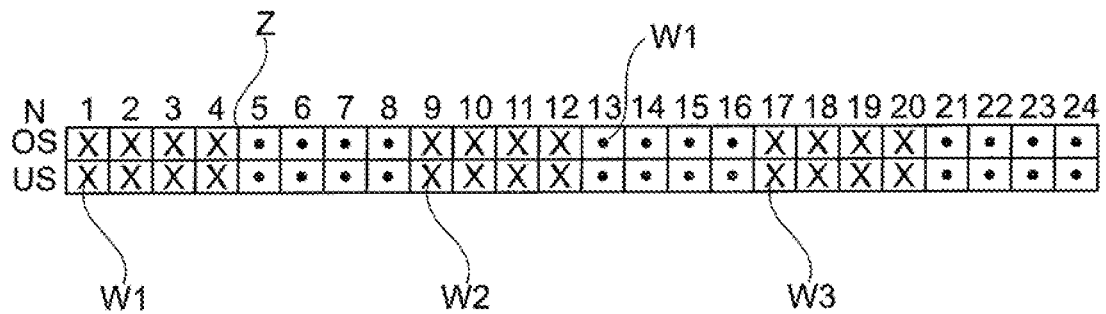
Figure 4:
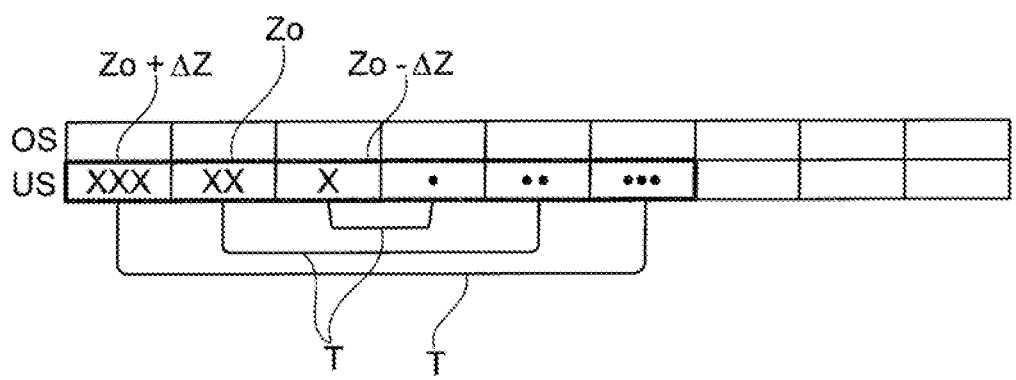
Figure 5:
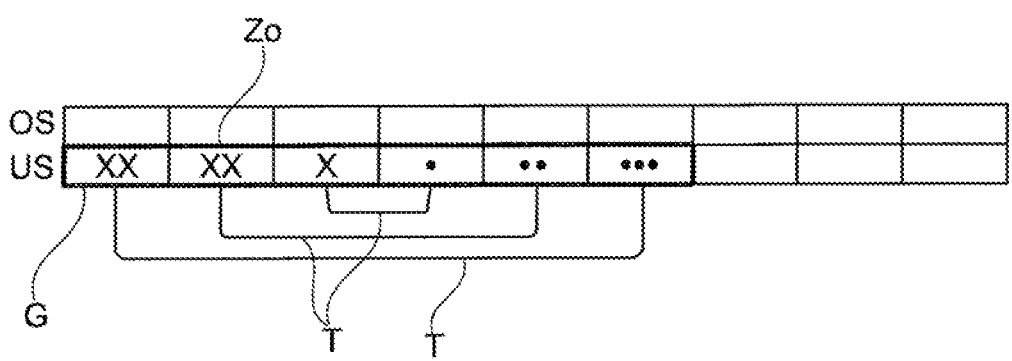
Figure 6:
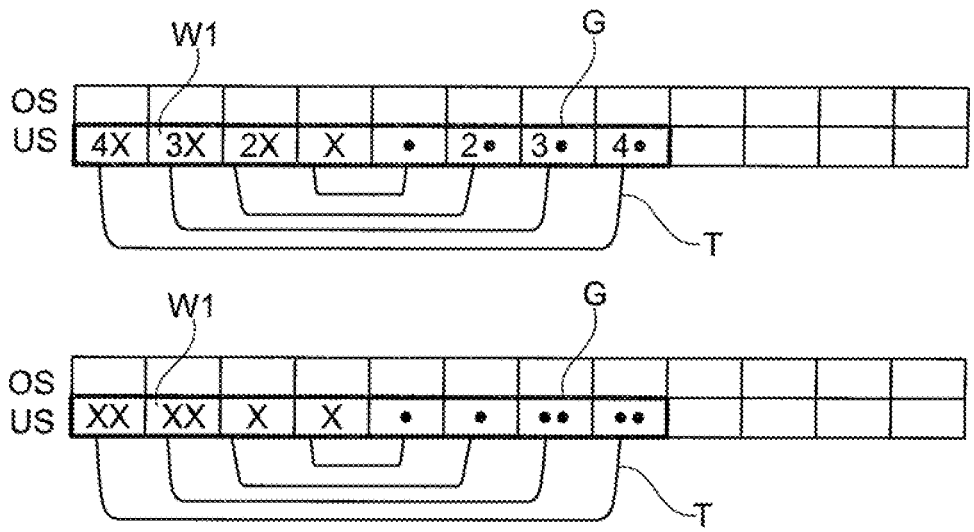
Figure 7:
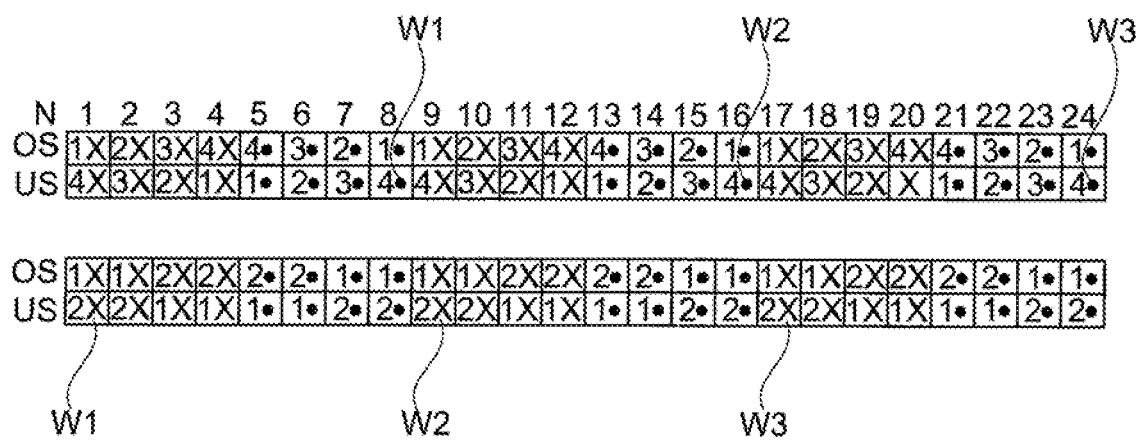

FIG. 1 is a schematic view of a zone plan with marking of the coil guide for the cases q=2, 3 and 4, FIG. 2 is a schematic view of a strand zone plan of a 2-pole, 3-strand tooth coil winding for the cases q=2, 3 and 4, FIG. 3 is a schematic view of a zone plan of a 2-pole, 3-strand tooth coil winding for the case q=4, FIG. 4 is a schematic view of a zone plan with different numbers of conductors for a multi-tooth coil with q=3, FIG. 5 is a schematic view of a an alternative design of a zone plan for FIG. 4 with different numbers of conductors for a multi-tooth coil with q=3, FIG. 6 is a schematic view of a two zone plans with different numbers of conductors for a multi-tooth coil with q=4, and FIG. 7 is a schematic view of a zone plan of a 2-pole, 3-strand tooth coil winding for a multi-tooth coil with q=4 with a decreasing number of conductors but identical groove filling.

The disclosure is described in further detail in reference to FIGS. 1 to 7. Identical reference numerals denote identical structural or functional features. FIG. 1 is a zone plan with marking of the coil guide for the cases q=2, 3 and 4 (wherein x and * represent the winding direction and thus the current direction).

A 2-pole, 3-strand rotating field stator with multi-tooth coil winding includes exactly N=3×2q=6q grooves N. In the case of the embodiment examples shown in FIG. 1, means, with q=2 (12 grooves), with q=3 (18 grooves) and with q=4 (24 grooves). Each winding strand W1, W2, W3 of the 3-strand multi-tooth coil winding includes, according to FIG. 2, two multi-tooth coils. One coil is located in the lower layer US and the other in upper layer OS. The two multi-tooth coils of a winding strand are offset with respect to one another by exactly one pole pitch. Thus, by N/2p groove pitches (wherein 2p is the number of poles), and, in the mentioned embodiment example, by $3q$ groove pitches. As a result, they, are arranged diametrically symmetrically. However, the winding direction and accordingly the current direction of the two multi-tooth coils of the winding strands W1, W2 is reversed. Although the transition to a higher stator groove number increases the winding effort, the upper field behavior and the heat dissipation of the windings over the lamination stack of the stator are improved. Furthermore, a low copper volume of the partial coils allows a simplification during the winding process.

FIG. 2 shows a strand zone plan of a 2-pole, 3-strand tooth coil winding for the cases q=2, 3 and 4. The winding strand W1 is shown as an example. The winding strands W1, W2, W3 of the 2-pole rotating field winding, according to FIG. 3, are offset with respect to one another by N/3p groove pitches, which means 2q groove pitches in the embodiment example. In FIG. 3, the zone plan of a 2-pole, 3-strand tooth coil winding for the case q=4 is represented.

If a rotating field winding with higher pole number is necessary, this can be simply implemented in that the zone plan shown in FIG. 3 is multiplied in accordance with the desired number of pole pairs. Accordingly, doubled in the case of a 4-pole winding.

Thus, considering the air gap field spectrum for the embodiment of a 3-strand multi-tooth coil winding, an air gap field spectrum with the following order numbers is excited:

v/p: 1+6*g with g=0, ±1, ±2, ±3, ±4,

If one considers the groove slot to be negligible, the value of the result is exactly q different winding factors that repeat cyclically as represented in the following table for q=2, 3 and 4.

| v/p | q = 2 $|\xi_v|$ | q = 3 $|\xi_v|$ | q = 4 $|\xi_v|$ |
|---|---|---|---|
| . . . | . . . | . . . | . . . |
| 13 | 0.4830 | 0.1088 | 0.6300 |
| 7 | 0.1294 | 0.0887 | 0.0788 |
| 1 | 0.4830 | 0.4799 | 0.4788 |
| −5 | 0.1294 | 0.1088 | 0.1027 |
| −11 | 0.4830 | 0.0887 | 0.0630 |
| . . . | . . . | . . . | . . . |

It is also possible to implement the q concentric partial coils T of a multi-tooth coil. According to FIG. 1, it represents a repeating common part, with different numbers of conductors in order to further improve the air gap field spectrum. Here, it is appropriate to select the different numbers of conductors of the partial coils T in each case so that a groove filling of equal amount is nevertheless achieved in all the grooves.

In order to increase the basic field winding factor, it is necessary to stagger the numbers of conductors of the q concentric partial coils T of a multi-tooth coil. Thus the number of conductors continuously, i.e., regularly, decreases from the outer partial coil T to the inner partial coil T. This winding state is represented in FIG. 4. FIG. 4 for this purpose shows a zone plan with different numbers of conductors for a multi-tooth coil with q=3.

FIG. 4 shows an embodiment where is particularly relevant in practice, namely the case with q=3. For all the grooves N of the complete 3-strand rotating field winding, this results in a groove filling of equal amount, if the following staggering of the numbers of conductors is used The number of the conductors of the partial coils T of a coil group G is then distributed as follows:
  a. the outermost partial coil T: Zo conductors+ΔZ conductors
  b. the central partial coil T: Zo conductors
  c. the inner partial coil T: Zo conductors−ΔZ conductors.

In an alternative embodiment, a non-continuous staggering of the numbers of conductors can be selected. For this purpose, FIG. 5 shows an alternative design of a zone plan with different numbers of conductors for a multi-tooth coil with q=3. The resulting rotating field winding is still symmetric, however, the stator grooves do not have a uniform groove filling. For this case of non-uniform groove fillings, with unequal numbers of conductors, the partial coils T of a multi-tooth coil winding can be implemented with different winding wire diameters. Thereby, the copper volume as well as the groove filling can be increased. The effective total conductor cross section over all the grooves can nevertheless be designed to be largely uniform.

In a particularly advantageous embodiment (not represented), the partial coils T of a multi-tooth coil winding can be formed with the same winding wire diameters but with x parallel connected coils with x-fold number of windings in order to increase the groove filling degree and make it uniform.

In the lower performance range, in 2-pole rotating field machines, the case q=4 is also of high practical relevance. In FIG. 6, two possibilities of conductor staggering are represented, which, in the complete 3-strand rotating field winding, lead to an identical groove filling in all the stator grooves.

FIG. 7 in each case shows a zone plan of a 2-pole, 3-strand tooth coil winding for a multi-tooth coil with q=4 with a decreasing number of conductors but identical groove filling. In the top view, a continuous reduction of the number of conductors occurs, while, in the bottom view, a zone plan with a nearly continuous decrease of the number of conductors is represented.

A nearly continuously decreasing number of conductors, where only two different numbers of conductors are used, can always be implemented when q can be divided by 2 to give a whole number, that is to say for q=2, 4, 6, . . . .

If Za denotes the higher number of conductors of the outer partial coils T, and Zi denotes the lower number of conductors of the inner partial coils T, a distribution of the numbers of conductors in the ratio of Zi/Za with a value of approximately 0.73 can be selected. The winding factors of the 5th and 7th order are brought to zero and the basic field winding factor can at the same time be increased as illustrated in the following table for the case q=4.

| v/p | $|\xi_v|$ |
|---|---|
| ... | ... |
| 13 | 0.0676 |
| 7 | 0 |
| 1 | 0.5134 |

-continued

| v/p | $|\xi_v|$ |
|---|---|
| −5 | 0 |
| ... | ... |

By a further reduction of the ratio of Zi/Za, the basic field winding factor can be further increased. For a ratio of approximately 0.53, one obtains winding factors for the upper fields of the 5th and 7th order corresponding to the case Zi/Za=1. The basic field winding factor can be further increased to the value of 0.5480. This corresponds to an increase by approximately 15% in comparison to the distribution Zi/Za=1. The following table illustrates this again with the example q=4.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A 3-strand rotating field machine with a 2p-pole stator with winding teeth (Z), formed with a winding arrangement, comprising:
  three winding strands, the winding arrangement is formed from wound coil groups with coils arranged in double layer windings, wherein coils of the coil groups are arranged so they concentrically enclose one another from inside to outside and surround two or more winding teeth, the respective coil winding numbers in grooves between the winding teeth are provided so that a substantially equal occupancy of each groove is provided with the same total conductor cross section of the coils per groove cross section, and a decrease of the number of conductors occurs from outside to inside,
  wherein the coils of the coil groups are arranged diametrically symmetrically with respect to one another and at least partially overlap spatially along the circumference in winding layers, wherein, for a coil group, a q-fold tooth coil is provided, where each case occupies half of 2*q adjacent grooves of the stator with the winding of a winding strand, wherein q=2, 3 or 4,
  wherein the number of conductors of a farther outward lying coil of a coil group is higher than the number of conductors of the inner coil concentrically surrounded by this farther outward lying coil,
  wherein the number of conductors of the coils continuously decreases from the outer coil to the inner coil, and
  wherein, with q=3, the number of the conductors of the coils of a coil group is distributed as follows:
    a. the outermost coil (T): Zo conductors+ΔZ conductors
    b. the central coil (T): Zo conductors
    c. the inner coil (T): Zo conductors−ΔZ conductors.

2. The 3-strand rotating field machine according to claim 1, wherein the coil groups in the front area of winding heads of the coils do not overlap and are wound without crossing coils or coil groups.

3. The 3-strand rotating field machine according to claim 1 wherein the coils have a changing width.

4. The 3-strand rotating field machine according to claim 1 where adjacent winding teeth or grooves of the stator, which are wound in part with a winding strand, are wound either in the upper layer or the lower layer.

5. The 3-strand rotating field machine according to claim 1 wherein the coils have a continuously changing width.

* * * * *